United States Patent [19]
Barbuto

[11] Patent Number: 4,548,385
[45] Date of Patent: Oct. 22, 1985

[54] FLEXIBLE SEAL FOR ROTOR VALVES

[75] Inventor: David J. Barbuto, Lynnfield, Mass.

[73] Assignee: Quality Controls, Inc., Tilton, N.H.

[21] Appl. No.: 372,815

[22] Filed: Apr. 28, 1982

Related U.S. Application Data

[63] Continuation of Ser. No. 104,889, Dec. 18, 1979, abandoned, which is a continuation-in-part of Ser. No. 59,219, Jul. 20, 1979, abandoned, which is a continuation of Ser. No. 892,771, Mar. 29, 1978, abandoned.

[51] Int. Cl.[4] ............................................. F16K 25/00
[52] U.S. Cl. ................................... 251/175; 251/182; 251/317; 251/368
[58] Field of Search ............... 251/175, 181, 182, 316, 251/317, 192

[56] References Cited

U.S. PATENT DOCUMENTS

| | | | |
|---|---|---|---|
| 2,234,434 | 3/1941 | Johnson | 251/182 |
| 2,857,130 | 10/1958 | Brisbane | 251/175 |
| 3,033,515 | 5/1962 | Brisbane | 251/175 |
| 3,497,179 | 2/1970 | Smyers | 251/175 |
| 3,556,158 | 1/1971 | Barbuto | 251/317 X |

FOREIGN PATENT DOCUMENTS 805137 11/1936 France ............... 251/182

Primary Examiner—Harold W. Weakley
Attorney, Agent, or Firm—Kenway & Jenney

[57] ABSTRACT

A rotor valve has a set of sealing members or inserts positioned in longitudinal channels formed on the outer surface of a cylindrical rotor. A resilient O-ring snuggly engaged in a groove in the rear surface of each insert urges it against a surrounding rotor chamber formed in a valve body. Due to the resilience of the O-ring, the fluid seal between the rotor and the rotor chamber does not bind due to contaminants or extreme variations in temperature. The sealing inserts are formed of a deformable material. Fluid pressure acting on the inserts deforms them to produce a lateral squeezing force on the O-ring. The interaction between the inserts and the O-ring enhances the integrity of both the seal between the inserts and the surrounding rotor chamber and the seal established by the O-ring itself between the rotor and the insert.

2 Claims, 4 Drawing Figures

FLEXIBLE SEAL FOR ROTOR VALVES

This is a continuation of application Ser. No. 104,889, filed Dec. 18, 1979, now abandoned, which is a continuation-in-part of application Ser. No. 059,219, filed July 20, 1979, now abandoned, which in turn was a continuation of Ser. No. 892,771, filed Mar. 29, 1978, now abandoned.

BACKGROUND OF THE INVENTION

This invention relates in general to valves of the plug or rotor type. More specifically, it relates to an improved arrangement for sealing the rotor within its chamber that avoids binding due to contaminants or extreme temperature variations. This invention is an improvement over the plug valve with renewable sealing inserts described in U.S. Pat. No. 3,218,026 to Roy.

As stated in the Roy patent, rotor valves have a significant advantage over other types of valves in that they are generally top loaded. This greatly facilitates maintenance since the working parts of the valve are readily removed or assembled without disconnecting pipes from the valve or extensive disassembly of the valve itself.

In general, the valves have a rotor that rotates about its longitudinal axis in a rotor chamber or bore formed in a valve housing. The rotor has a transverse passage or passages that communicate between inlet and outlet ports when the valve is in an open position. When the rotor is rotated to a closed position, the rotor blocks a fluid flow through the valve. A central problem with this type of valve is how to establish an effective fluid seal between the mating surfaces of the rotor and the surrounding chamber while at the same time avoiding excessive wear, a high operating torque, and jamming or binding. It is also important that the rotor valve have a cost of manufacture that is competitive with alternative valve types.

One common rotor valve design is the plug cock valve which uses a tapered plug (or rotor) lapped to conform closely to the tapered walls of the valve chamber. This valve, however, is readily fouled by corrosion and is relatively expensive to manufacture due to the cost of machining the tapered plug and chamber surfaces to close tolerances.

The aforementioned U.S. Pat. No. 3,218,026 to Roy and U.S. Pat. No. 3,556,153 to Barbuto, both commonly assigned with the present application, describe rotor valves that address the problems discussed above by using sealing inserts or segments to establish a seal between the rotor and the surrounding valve chamber. In the valve described in applicant's U.S. Pat. No. 3,556,153, four curved sealing segments ride on the outer surface of a solid, cylindrical rotor. The segments are angularly spaced and secured rigidly in narrow, longitudinally extending grooves formed on the outer surface of the rotor. The space between the segments provides a wiping action to clean sediment from the mating fluid-sealing surfaces of the segments and the chamber. In the Roy valve, the sealing inserts are rigidly held in wide, longitudinally extending channels also formed on the outer surface of a cylindrical rotor. The outer surface of each insert is curved to mate with the wall of the valve chamber. The Roy inserts are either rigid and machined to close tolerances or resilient and slightly oversized.

Both the Roy sealing inserts and applicant's earlier sealing segments have a significant advantage over conventional rotor valves in that worn or defective sealing members are easily replaced at a comparatively low cost. Further, none of these sealing member valves require lubrication. They nevertheless have several drawbacks. First, they are susceptible to binding due to extreme temperature variations or the presence of contaminants that lodge between the sealing members and the rotor chamber wall. While applicant's U.S. Pat. No. 3,556,153 sealing segments do provide a wiping action, it is not sufficient in applications where there is an unusually high concentration of contaminants such as fine dust particles. Second, the resilient Roy sealing inserts wear readily and create a relatively high operating torque. Third, the rigid Roy sealing inserts do not conform to irregularities in the chamber wall to maintain a tight fluid seal with a minimum of wear.

In ball valves, it is known to use annular, washer-like, sealing members that are spring loaded to establish a fluid seal against the spherical outer surface of the ball. The sealing members however, do not establish a fluid seal over an extended curved surface, but rather what is substantially a line seal, typically circular in shape. The problems inherent in ball valve seals are therefore basically different from those faced in rotor valves. For example, the problem of machining mating surfaces to close tolerances and the binding, jamming, and operating torque problems in ball valves and rotor valves are quite different. It should also be noted that these ball valve sealing members are typically resilient and have a specially designed cross-sectional configuration adapted to establish a seal against a smooth, spherical surface. All of these differences are present in the ball valves described in U.S. Pat. Nos. 3,252,684; 3,472,270; 3,576,309; 3,604,682; 3,667,727; and 4,111,393.

U.S. Pat. Nos. 197,924; 2,545,220 and 3,967,811 describe rotor valves that include sealing arrangements where a resilient member such as a spring urges a contoured sealing element into mating contact with a rotor chamber wall. In these valves, however, this resilient member does not itself form a fluid-tight seal, nor does it hold the sealing elements tightly enough against the chamber wall to effect a seal in the absence of fluid pressure. U.S. Pat. No. 1,081,322 describes another rotor valve using spring loaded sealing elements. In this valve fluid pressure retracts one of two oppositely directed sealing elements to allow the passage of fluid between the retracted element and the rotor chamber wall. A major disadvantage of this sealing arrangement is that it introduces contaminants into the area between the sealing element and the chamber wall.

U.S. Pat. No. 2,371,657 describes another rotor valve with a spring loaded sealing assembly carried on the rotor and engaging a surrounding housing. This valve also differs from the usual rotor valve because every port has a sealing element which can, in response to sensed fluid pressure levels on both sides of the sealing element, block or pass a fluid flow through that port in either direction. The sealing assembly uses an internal O-ring. It, however, does not urge the sealing element into a seated, fluid sealing position with respect to the chamber wall. Also, the O-ring does not deform in response to the fluid pressure to enhance any fluid seal.

It is therefore a principal object of this invention to provide a sealing arrangement for a rotor valve that does not bind due to contaminants, particularly high concentrations of fine particulate contaminants, or temperature variations.

Another object of the invention is to provide such a rotor valve sealing arrangement that is easy to maintain, has a low-torque operating characteristic and accommodates irregularities in the valve chamber wall.

A further object is to provide a rotor valve with rigid sealing surfaces that has the foregoing advantages and has good wear characteristics.

Still a further object is to provide a rotor valve sealing arrangement which automatically enhances the seal in the presence of high fluid pressures.

Yet another object is to provide a rotor valve sealing arrangement with the foregoing advantages that also has a relatively low cost of manufacture.

SUMMARY OF THE INVENTION

A rotor valve utilizes a straight cylindrical rotor that rotates about its longitudinal axis in a cylindrical rotor chamber or bore in a valve body. The rotor has one or more transverse passages that align with inlet and outlet openings in the valve body when the rotor is in an "open" position.

A set of sealing inserts formed of a generally rigid yet deformable material compatible with the fluid carried by the valve are held in longitudinally extending channels formed on the outer surface of the rotor. The inserts are preferably formed of a material that also has a low coefficient of sliding friction. The inserts each have an outer surface adapted to mate with an opposite portion of the rotor chamber wall.

A resilient O-ring is snuggly fitted in a groove formed in the rear surface of the insert and compressed between each insert and the rotor. The O-ring develops a radially directed force that flexibly urges the outer surface of the inserts into sliding, fluid-tight engagement with the chamber wall. There is a slight clearance between the rear surface of the insert and the rotor.

At least two of the inserts have a central opening that aligns with one of the transverse passages in the rotor and, when the rotor is in the open position, with one of the inlet or outlet ports. In these inserts the O-ring, in addition to urging the insert against the chamber wall, also blocks a fluid flow between the insert and the rotor. The groove holding the O-ring is spaced closely from the central opening in the insert resulting in a comparatively narrow wall intermediate the central opening and the O-ring. This wall is sufficiently narrow that fluid pressure displaces the wall laterally away from the central opening which in turn squeezes the deforms the snuggly engaged O-ring. As a result there is an increase (1) in the radial force urging the insert into a sealing engagement with the surrounding rotor chamber and (2) in the sealing effectiveness of the O-ring itself to block the flow of fluid behind the insert to the mating surfaces of the insert and the rotor chamber.

These and other features and objects of the invention will be more fully understood from the following detailed description which should be read in light of the accompanying drawings.

DETAILED DESCRIPTION OF THE PREFERRED EMBODIMENTS

Figure 1:
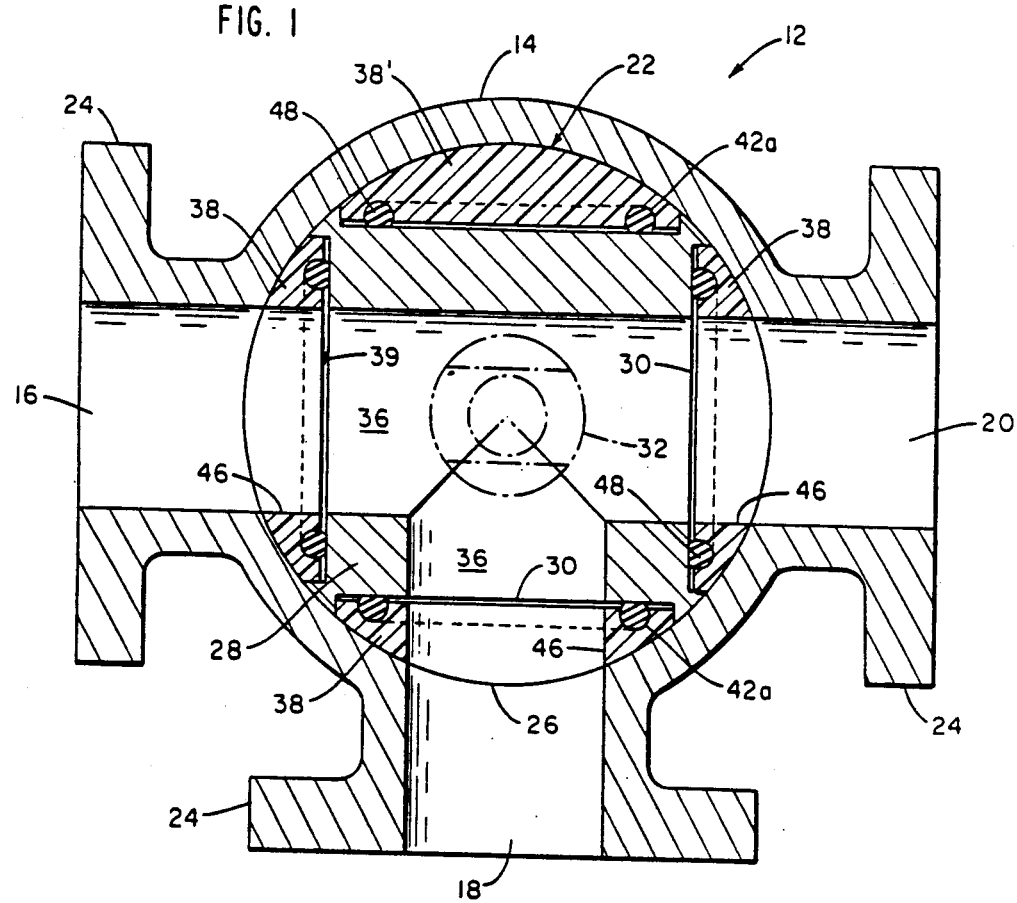
FIG. 1 is a view in horizontal section of a three-way rotor valve and sealing arrangement constructed according to the invention.
Figure 2:
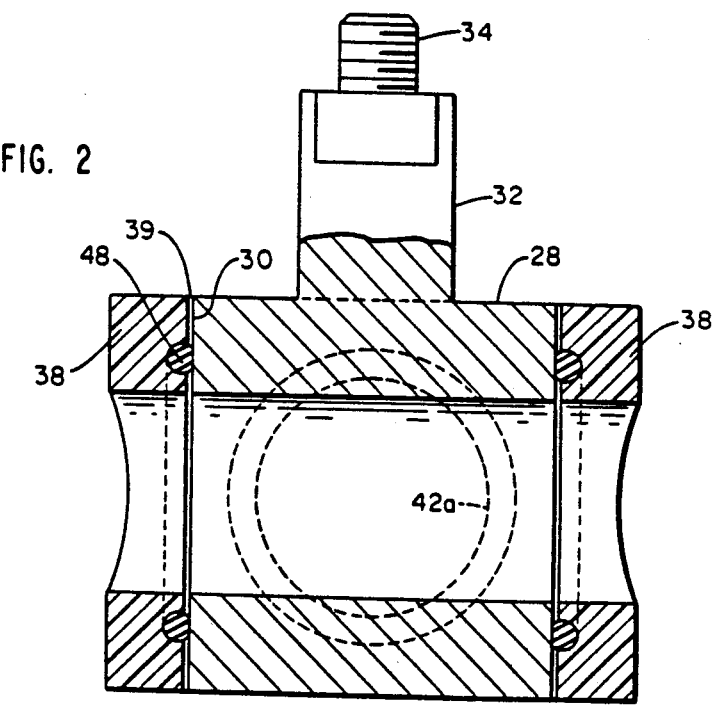
FIG. 2 is a view in vertical section of the rotor and sealing arrangement shown in FIG. 1.

With reference to FIGS. 1 and 2, a valve 12 according to this invention includes a one-piece body 14 having ports 16, 18, and 20 in fluid communication with a central bore or rotor chamber 22. The valve body may be connected to pipes or other conduits at flanges 24 formed integrally with the body 14. While this invention will be described with reference to a three-way valve having three ports, it will be understood that the features of this invention are equally applicable to valves with two ports or more than three ports. It will also be understood that connections at the ports can be made by threads or any other well-known technique.

The rotor chamber 22 is generally cylindrical in shape, defined by a curved side wall 26 and generally flat top and bottom walls (not shown) defined by the bottom wall of the body 14 and a conventional removable cap (not shown), respectively. The wall 26 is interrupted only by the ports 16, 18, and 20. A straight cylindrical rotor 28 is disposed in the rotor chamber 22. The rotor substantially fills the chamber 22 except for four equiangularly spaced and longitudinally extending channels 30 formed on the outer surface of the rotor. The rotor includes an integrally formed stem 32 that projects through a suitably formed hole in the valve cap. A thread 34 secured in the end of the valve stem provides a means for securing a handle (not shown) to the rotor. The rotor also has three radial passages 36 that each align with one of the ports 16, 18, and 20 when the valve is in its full open position, as shown. A sealing member or insert 38 or 38' is held in each of the channels 30. Each insert, best seen in FIG. 3, has a curved outer face 40 adapted to mate with the chamber wall 26 to provide a sliding, fluid-tight seal between the rotor and the rotor chamber.

An inner or rear face 42 of each insert is substantially flat and spaced slightly by a clearance 39 from the opposing surface of the channel 30 during normal operation. The side walls 44 are also substantially flat and at right angles to the rear wall 42. Each side wall slidably engages the opposite side wall of the channel 30 to locate the insert laterally on the rotor. Each insert 38 contains a central circular opening 46 that aligns with one of the passages 36 in the rotor. The insert 38' has no opening. Flow through the valve is stopped by rotating the rotor until the insert 38' completely blocks the inlet port (the fully closed position). The inserts are formed of a generally rigid yet deformable structural material that is compatible with the fluids controlled by the valve. The material is preferably a plastic resin such as those sold by E. I. DuPont DeNemours and Co. under the trade designation Teflon or Delrin. These materials also exhibit a low coefficient of sliding friction.

A principal feature of the invention is a set of O-rings 48 that are each snugly seated in a groove 42a formed in the rear wall of one of the inserts 38, 38'. Each O-ring 48 has its cross-sectional dimensions and resiliency selected so that when the rotor and inserts are seated in the chamber 22, the O-rings are slightly compressed radially, as shown. This compressive pre-loading generates a radial spring force that urges the inserts against the chamber wall 26 to form a sliding, substantially fluid-tight seal. Because the O-rings are resilient, the seal is flexible. It should be noted that the clearance 39 also contributes to the flexibility of the seal since it allows a "backward" radial movement of the inserts from its normal, wall-engaging position. The dimensions of the groove 42a are selected to locate the O-ring 48 on the insert, preferably centered on both the insert and the opening 46 to evenly distribute the spring force. The depth and width of the groove 42a are selected so that the O-ring projects from the groove a sufficient distance to be compressed slightly when the inserts are in their normal operating position (FIGS. 1 and 2). The groove is narrow enough to firmly engage the O-ring. The O-ring itself must have a sufficient thickness to develop the desired spring force when it is compressed.

Figure 3:
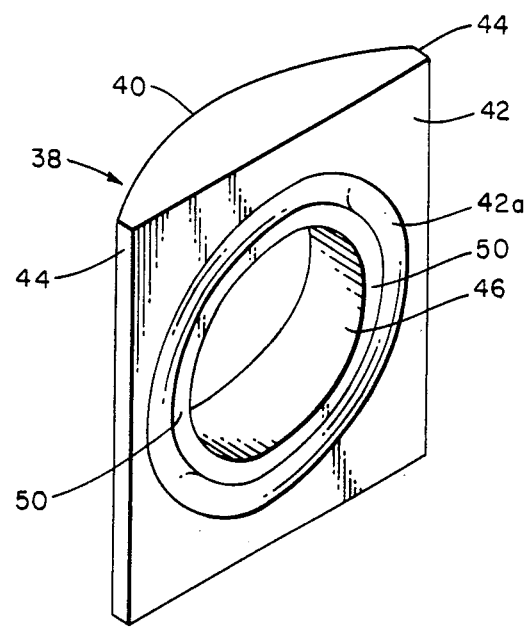
FIG. 3 is a perspective view of the sealing insert shown in FIGS. 1 and 2.
Figure 4:
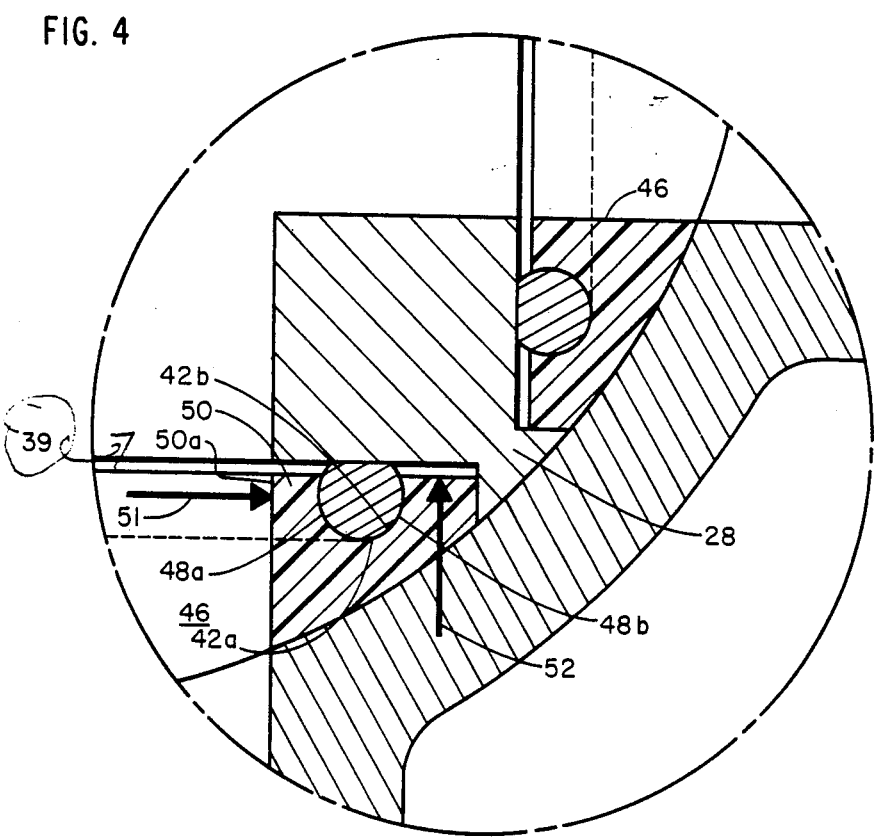
FIG. 4 is an enlarged fragmentary view of the sealing arrangement shown in FIG. 1, showing the interaction between the O-ring and the insert in the presence of an applied fluid pressure.

Another principal feature of this invention is that the groove 42a is located on the insert 38 with respect to the central circular opening 46 to provide a relatively narrow wall 50 separating the central opening from the groove (FIGS. 3 and 4). As is best seen in FIG. 4, fluid passing through the opening 46 exerts pressure against an inner surface 50a of the wall 50 in a "lateral" direction indicated by an arrow 51. The wall 50 is sufficiently narrow in this lateral direction that this lateral fluid pressure deforms the wall outwardly against the O-ring 48.

Since the O-ring already snugly engaged in the groove 42a, the lateral outward deformation of the wall 50 develops a radially directed force in the O-ring. This "redistributed" radial force acts in direction indicated by an arrow 52 (FIG. 4). It enhances both the seal between the insert 38 and the rotor chamber 22 and the seal established directly by the O-ring between the insert 38 and the rotor 28. Thus the flexible seal of this invention automatically increases its effectiveness in response to increased fluid pressures that would otherwise destroy or reduce the effectiveness of the seal.

By way of illustration, but not of limitation, this invention can be used in a standard one inch rotor valve with sealing inserts formed of the material sold under the trade designation Teflon. The port or opening 46 will typically have a diameter of ¾ inch. The wall 50 for this embodiment can have a lateral thickness of 0.060 inch for use in conjunction with a conventional O-ring having a diameter of 0.070 inch and seated snugly in the groove 42a.

The flexible seal of this invention has been found to avoid a binding condition that heretofore would render conventional rotor valves inoperable. It has proven particularly effective where the valve operates in an environment laden with fine dust or other particulate contaminants. It is also effective in avoiding binding due to different thermal expansion rates of the valve components thereby allowing operation at extreme temperatures. It should be noted that this sealing arrangement also provides convenient maintenance and replaceability of worn inserts, jam-free operation, self-lubrication and a favorable cost of manufacture.

Although the invention has been described with reference to a straight cylindrical rotor, it can also be applied to tapered rotors. However, a tapered rotor presents additional difficulties and cost increases well known to those skilled in the art. Also, while the invention has been described with reference to an O-ring as the resilient member, it will be understood that closed loop resilient members with different cross-sectional shapes can be used. These and other modifications and variations will occur to those skilled in the art from the foregoing detailed description and the accompanying drawings. Such modifications and variations are intended to fall within the scope of the appended claims.

What is claimed and desired to be secured by Letters Patent is:

1. In a rotor valve having a body with at least one fluid inlet port and at least one fluid outlet port, a cylindrical rotor chamber formed in the body and in fluid communication with the ports, and a rotor having a cylindrical outer surface disposed in said rotor chamber having an interior bore, said rotor being rotatable about its longitudinal axis in said chamber to control a fluid flow through said valve among said ports by way of said interior bore, wherein the improvement comprises means for establishing a fluid seal between said rotor and said rotor chamber, comprising a plurality of channels formed on the outer surface of said rotor, each of said channels extending parallel to said axis of rotation and having a rear surface facing said rotor chamber and a pair of side surfaces, a plurality of sealing members formed of a generally rigid yet deformable material that exhibits a low coefficient of sliding friction comprising tetrafluoroethylene, each of said sealing members being seated in an associated one of said channels, said members each having a curved outer surface adjacent said rotor chamber having the configuration of a portion of a cylinder, said sealing member outer surface mating with the surface of said rotor chamber in a fluid-sealing relationship over the surface area of said outer surface, a rear surface opposite said curved surface which is closely spaced from said rear surface of said channel and an opening that extends through said sealing member from said outer curved surface to said rear surface, said opening being positioned to align with said ports to allow said fluid flow through said port and said opening to said interior bore, a groove formed in said rear surface of said sealing member, said groove being concentric about said opening, circumscribing said opening, and spaced laterally from said opening by a uniform distance to define a narrow, circular wall, a plurality of resilient O-ring members, each of said resilient members being snugly engaged within an associated one of said grooves with a portion of said resilient member not held in said groove protruding from said rear surface at least the distance of said spacing to develop a radial force that flexibly urges the curved surface of said insert into said sliding, fluid-tight engagement with said chamber and to establish a fluid seal between the associated sealing member and said rotor, wherein said wall has substantially uniform dimensions and is sufficiently narrow that the wall will deform laterally outward in response to fluid pressure in the valve thereby compressing said resilient member engaged in said groove which in turn generates an enhanced degree of said radial force and an enhancement of said fluid seal between the associated sealing member and said rotor, said resilient members providing the principal radial sealing force urging said sealing members into said fluid-sealing relationship with the opposite portion of said rotor chamber.

2. A rotor valve according to claim 1 wherein said wall has a lateral thickness of approximately 0.060 inch.

* * * * *